United States Patent
McQuaid (10) Patent No.: US 7,748,270 B2
(45) Date of Patent: Jul. 6, 2010

(54) LIQUID LEVEL INDICATOR

(75) Inventor: Brendon Arthur McQuaid, Sydney (CA)

(73) Assignee: Umbrella Oil Heat Products, Inc. (CA)

( * ) Notice: Subject to any disclaimer, the term of this patent is extended or adjusted under 35 U.S.C. 154(b) by 756 days.

(21) Appl. No.: 10/569,738

(22) PCT Filed: Aug. 30, 2004

(86) PCT No.: PCT/CA2004/001582

§ 371 (c)(1), (2), (4) Date: Feb. 28, 2006

(87) PCT Pub. No.: WO2005/022093

PCT Pub. Date: Mar. 10, 2005

(65) Prior Publication Data

US 2008/0173086 A1    Jul. 24, 2008

(30) Foreign Application Priority Data

Sep. 9, 2003 (CA) ................................ 2440066

(51) Int. Cl.
*G01F 23/34* (2006.01)
(52) U.S. Cl. .................................. 73/317; 73/322
(58) Field of Classification Search .............. 73/317, 73/312, 322
See application file for complete search history.

(56) References Cited

U.S. PATENT DOCUMENTS

| | | | |
|---|---|---|---|
| 1,922,362 A | 8/1933 | Halversen | |
| 2,240,669 A | 5/1941 | Russo | |
| 2,255,310 A | 9/1941 | D'Arcey | |
| 2,316,377 A | 4/1943 | Wilhelm | |
| 2,446,844 A | 8/1948 | Molaver | |
| 2,651,200 A | 9/1953 | Colburn | |
| 2,834,211 A * | 5/1958 | Samaritano | 73/322 |
| 2,889,708 A | 6/1959 | Williams | |
| 2,904,352 A * | 9/1959 | Lisciani | 285/15 |
| 4,807,472 A * | 2/1989 | Brown et al. | 73/313 |

* cited by examiner

*Primary Examiner*—John Fitzgerald
(74) *Attorney, Agent, or Firm*—McDermott Will & Emery LLP (57) ABSTRACT

A liquid level indicator (1) is provided for sealing engagement with an opening of a receptacle. A float (8) is used which rests at the liquid level and which is connected to a float rod (7), which in turn is pivotally connected to fixed (5) and slidable rod (6). Upon changing liquid levels, the float (8) and, accordingly, the slidable rod (6) move and the position of the slidable rod with respect to a marked transparent cup (11) disposed outside of the receptacle, indicates the liquid level. The transparent cup (11) covers the portion of the indicator outside of the receptacle and serves to provide a fluid- and air-tight seal between the interior and exterior of the receptacle when the indicator is in place. In one embodiment the liquid level indicator may be used with oil tanks. A transparent cup (11) for use with existing devices is also taught.

11 Claims, 8 Drawing Sheets

LIQUID LEVEL INDICATOR

This application is the U.S. National Phase under 35 U.S.C. §371 of International Application No. PCT/CA2004/001582, filed on Aug. 30, 2004, which in turn claims the benefit of U.S. application Ser. No. 10/650,736, filed on Aug. 29, 2003 and Canadian Application No. 2,440,066, filed on Sept. 9, 2003, the disclosures of which are incorporated by reference herein.

FIELD OF THE INVENTION

The present invention relates generally to the field of liquid level indication and more particularly float type indicators.

BACKGROUND OF THE INVENTION

Liquid level indication is required for use with tanks containing liquids such as oil tanks for use in heating. The following patents are considered to be of general relevance to the subject matter of the present invention and are not believed to anticipate or render the present invention obvious, whether taken alone or in any combination.

Each of the patents listed below is directed to a liquid level gauge using a float fixed to a rod, in turn, pivotally attached to a sliding rod and a support rod, wherein the position of the sliding rod within a transparent cup disposed outside of the tank indicates the liquid level in the tank.

U.S. Pat. No. 2,889,708 (R. F. Williams) entitled GAUGE describes a threaded flange integral with a nut head for securing the gauge to the tank. The float is described as being an ordinary cork or like float. The gauge is intended to be tamper proof and is locked together by pressure, punch or other form of distortion.

U.S. Pat. No. 2,446,844 (H. Molayer) entitled LIQUID GAUGE discloses a threaded bushing for screwing onto the tank opening. The inverted closed cup is then screwed within the bushing. Washers are used to obtain a tight seal.

U.S. Pat. No. 2,651,200 (B. E. Colburn) entitled TANK GAUGE teaches a gauge that may be used with tank openings of various sizes by having differently sized pipe threadings as part of a plug mounting. The inverted closed cup is then screwed on within the plug mounting.

Canadian Patent No. 454,572 (Edward Olszowka) entitled LIQUID GAUGE describes a gauge which advantages include the ability to provide an indication of the direction of the float and a float which will not absorb moisture. The gauge is held in place by a collar around the tank's opening and includes an annular recess into which the transparent cup fits. Two washers are provided at either end of the cup for sealing.

Canadian Patent No. 447,723 (Alois Kresta) entitled TANK GAUGE FOR OIL AND OTHER LIQUID discloses a gauge which may be easily and quickly placed in the tank and secured with a liquid- and gas-tight seal. The base of the gauge member has an expandable collar adapted for insertion into the bore of the tank, the collar being expandable by applying external pressure. The transparent gauge cup is held in place by counterbored circular recess in the gauge.

Canadian Patent No. 475,098 (Joseph F. Wilhelm) entitled GAUGES teaches a gauge having a plug body with threads for securing to the tank opening and having a flange for tightening with a wrench. The transparent cup is snugly fitted to the gauge and is protected by a casing. Washers or gaskets are used to obtain a tight seal.

U.S. Pat. No. 2,255,310 (J. D'Arcey) OIL GAUGE describes an annular plug which engages (preferably by threadings) a boss on the tank. The plug includes an internal flange adapted to receive a wrench for tightening. The inner face of the plug is threaded to receive a nipple on the end of which rests an annular plate which supports a transparent head. The plug and nipple may alternatively be replaced by a single nipple. A dial is also provided for calibration. Gaskets are used to provide an air-tight seal.

U.S. Pat. No. 2,240,669 (M. P. Russo) LIQUID GAUGE discloses a liquid gauge readily securable to a cap or collar threaded into a brushing or neck member secured to the tank. The transparent cup is encased within a protective casing and attached to a socket of the gauge. An air-tight seal is provided by gaskets or washers.

The above-listed patents relate to liquid level gauges using a float, arrangement of pivoting rods and sliding rod indicating the liquid level using a transparent cup resting outside of the tank.

Various ways of attaching the gauge to the tank are proposed in the prior patents including the use of a threaded base for engagement with the threaded tank aperture. However, none of the enclosed patents teaches a configuration which is described and claimed herein which affords the advantages which will become apparent hereinbelow.

The primary cause of accelerated domestic oil tank corrosion is chlorine-laden water and therefore it is beneficial to prevent such water from entering into domestic heating oil tanks. The liquid level indicator of the present invention is purposed to attain such prevention while operating as an effective indicator. Certain prior devices use a transparent cup which is set into the centre of the base block which has a well effect and thus retains chlorine-laden water and allows such water to enter into the tanks. Such configuration provides less support to the transparent cup which may crack or break easily under normal conditions.

SUMMARY OF THE INVENTION

According to an aspect of the present invention there is provided a liquid level indicator for use with a receptacle, the indicator comprising:

a base block for sealing engagement with a receptacle opening area;

an enclosure disposed in a sealing engagement with said base block and covering substantially entirely a portion of the base block extending outside the receptacle for shielding the base block against precipitation;

a float arrangement comprising a float disposed for floating at a liquid level within the receptacle, and a sliding rod connected to the float at one end and having a distal end extending slidably through the base block into the enclosure, the enclosure being adapted for indicating the position of the slidable rod within the enclosure to thereby determine the liquid level within the receptacle.

The enclosure may be connected to the base block using a conventional connection, for example a threaded connection, a bayonet connection, a snap connection and a spring clip connection.

According to a further aspect of the present invention there is provided a liquid level indicator for use with a tank, the device comprising:

a base block having a first male screw portion adapted for sealing engagement with a collar flange of a tank and a second male screw portion adapted for sealing engagement with an enclosure which is adapted for sealing engagement with, and for covering a portion of the base block outside of the tank to shield the base block against precipitation;

a float arrangement comprising a float disposed for floating at a liquid level within the receptacle, and a sliding rod connected to the float at one end and having a distal end extending slidably through the base block into the enclosure, the enclosure being adapted for indicating the position of the slidable rod within the enclosure to thereby determine the liquid level within the tank.

According to yet another aspect of the invention, there is provided a liquid level indicator for use with a tank, the device comprising:

a base block having a male screw portion adapted for sealing engagement with a collar flange of a tank and locking projections and locking indents adapted for engagement with locking cams of an enclosure, said enclosure being adapted for sealing engagement with, and for covering a portion of the base block outside of the tank to shield the base block against precipitation;

a float arrangement comprising a float disposed for floating at a liquid level within the receptacle, and a sliding rod connected to the float at one end and having a distal end extending slidably through the base block into the enclosure, the enclosure being adapted for indicating the position of the slidable rod within the enclosure to thereby determine the liquid level within the tank.

The receptacle, or tank, may be a heating oil tank. The engagement portion base block may include a raised portion for receiving a wrench for tightening of the engagement portion to the receptacle opening or tank collar flange. Having this portion raised also serves to mitigate or prevent water accumulation in this area.

The enclosure may be provided with an interior flange lying parallel with the enclosure opening; internal threadings disposed between the enclosure opening and the flange; a gasket, disposed between the internal flange and the internal threadings; whereby tightening of the enclosure onto the base block (or second male screw portion) distorts the gasket until the gasket comes in contact with the base block (or male screw portion) to form a liquid- and gas-tight seal.

In an alternative arrangement, the enclosure may be provided with an interior flange lying parallel with the enclosure opening and interior locking cams disposed between the disclosure opening and the flange. The base block may comprise locking projections and locking indents disposed at an outer edge thereof for locking engagement with the interior locking cams of the enclosure.

The portion of the base block outside of the receptacle (eg. the second male screw portion) may have a larger cross-sectional area than a portion of the base block of the engagement portion (e.g. the first male screw portion). Such a configuration assists in providing a liquid- and air-tight barrier.

The enclosure may have markings and the slidable rod may have an indicator disk attached thereto to facilitate readings of the position of the slidable rod with respect to the enclosure and thus reading of the liquid level.

The float may be made of a material which is resistant to moisture accumulation. The level indicator may have markings for indicating a position of the float relative to a vertical axis of the indicator.

According to another aspect of the present invention there is provided an enclosure as described above existing on its own. In particular there is provided an enclosure for sealing engagement with, and covering substantially entirely a portion of a base block outside of a receptacle and for indicating the position of a slidable rod within the enclosure to thereby determine a liquid level within the receptacle, the enclosure comprising engagement means at an open end thereof for sealing engagement with the engagement portion. The engagement means may comprise at least one resilient member for engagement with the base block for resiliently deforming to achieve a secure fit. Alternatively, the engagement means may comprise internal threadings at an open end of the enclosure for engagement with the base block. The at least one resilient member may comprise at least one half arrow shaped clip adapted to be pressed against and locked against the base block. In yet another embodiment, the engagement means may comprise internal locking cams for locking engagement with locking projections and locking indents formed at an outer edge of the engagement portion.

BRIEF DESCRIPTION OF THE DRAWINGS

Embodiments of the invention will be described below with reference to the accompanying drawings in which:

FIG. 8b is a perspective view of the base block of FIG. 8a;

DETAILED DESCRIPTION OF THE INVENTION

Figure 1:
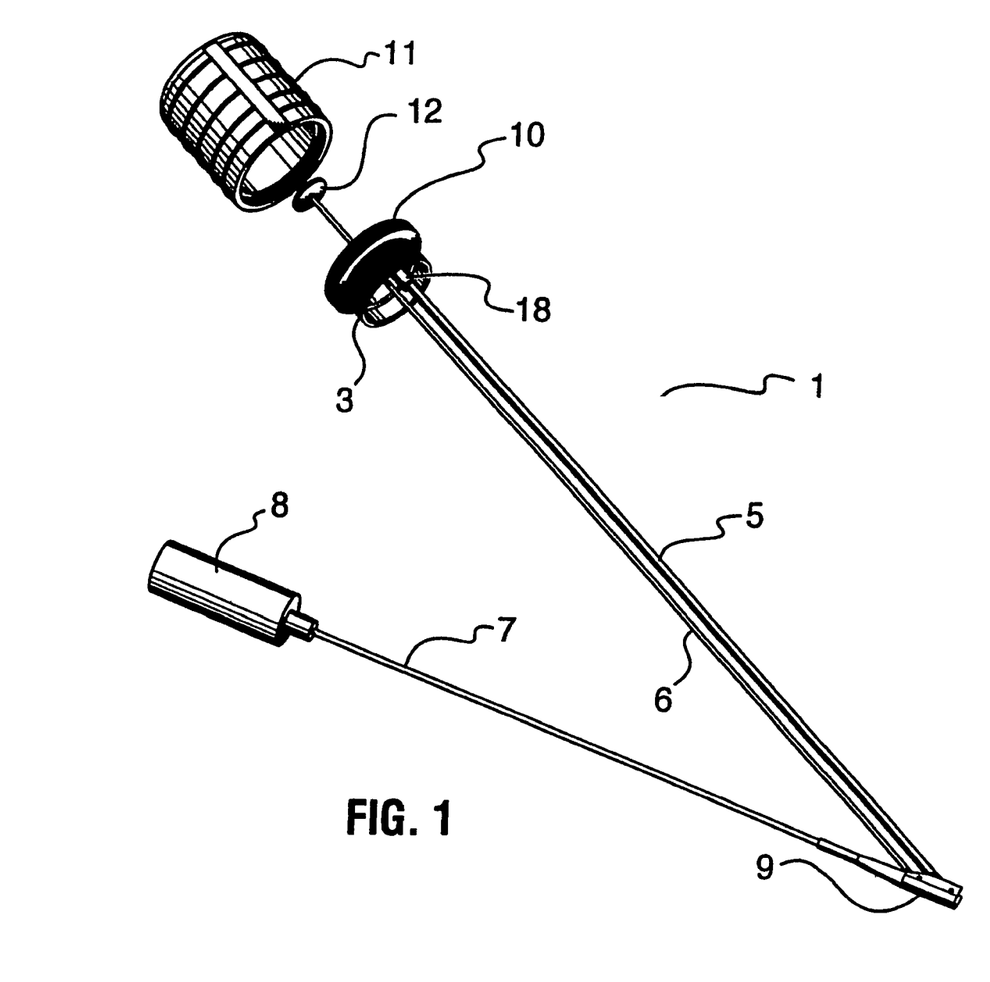
FIG. 1 is a perspective view of a liquid level indicator according to an embodiment of the present invention.
Figure 2A:
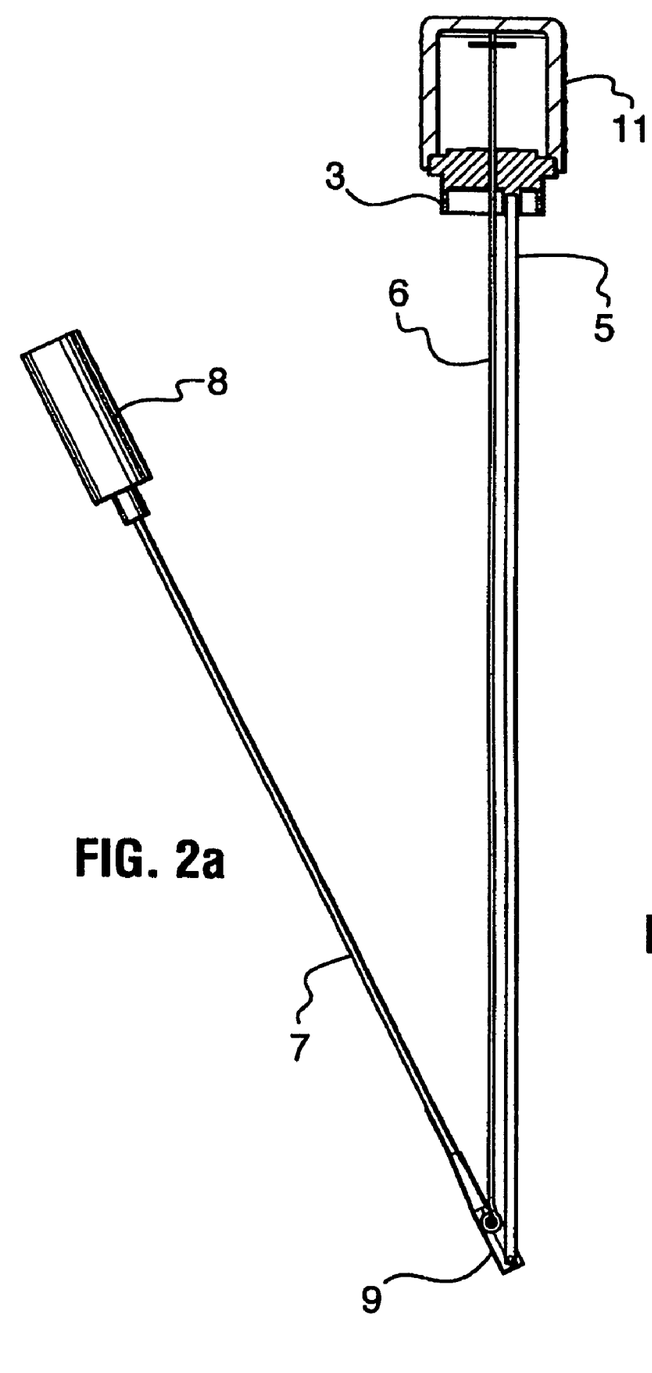
FIGS. 2a and 2b are side and top plan views respectively of a liquid level indicator in accordance with an embodiment of the present invention.
Figure 2B:
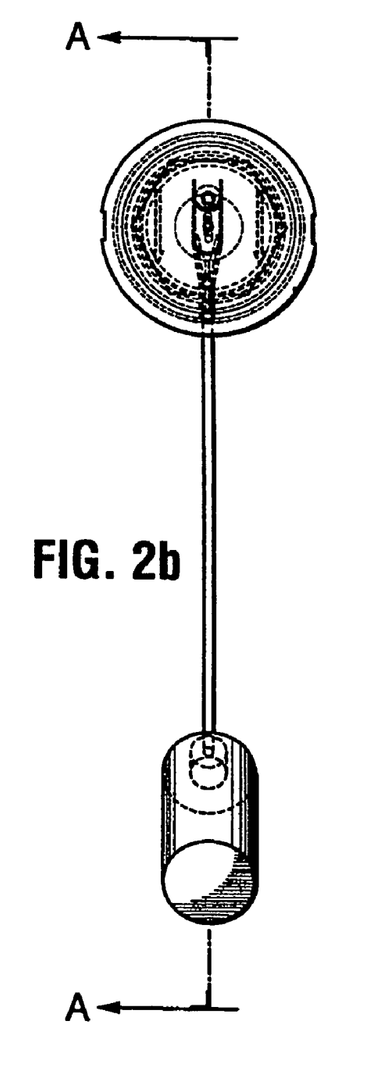

Referring to FIGS. 1, 2a and 2b, a level indicator (1) is shown. A male screw portion (3) is used to attach the indicator to a receptacle opening area, or collar flange having internal threadings. A fixed rod (5) is fixed to the underside of the male screw portion (3) and extends down into the receptacle. A slidable rod (6) is slidable through the male screw portion (3) into a removable enclosure or inverted transparent cup (11). A float rod (7) is pivotally attached to both the fixed rod (5) and the slidable rod (6). The float rod (7) has a float (8) attached thereto, preferably at the end thereof, for floating at a liquid level. Possible float materials may include air tight plastic or cork having a sealant on its exterior such as a varnish. The rods (5,6,7) need not be directly connected to each other and a connector (9) may be used for improved operation or ease of manufacture or assembly.

Figure 3:
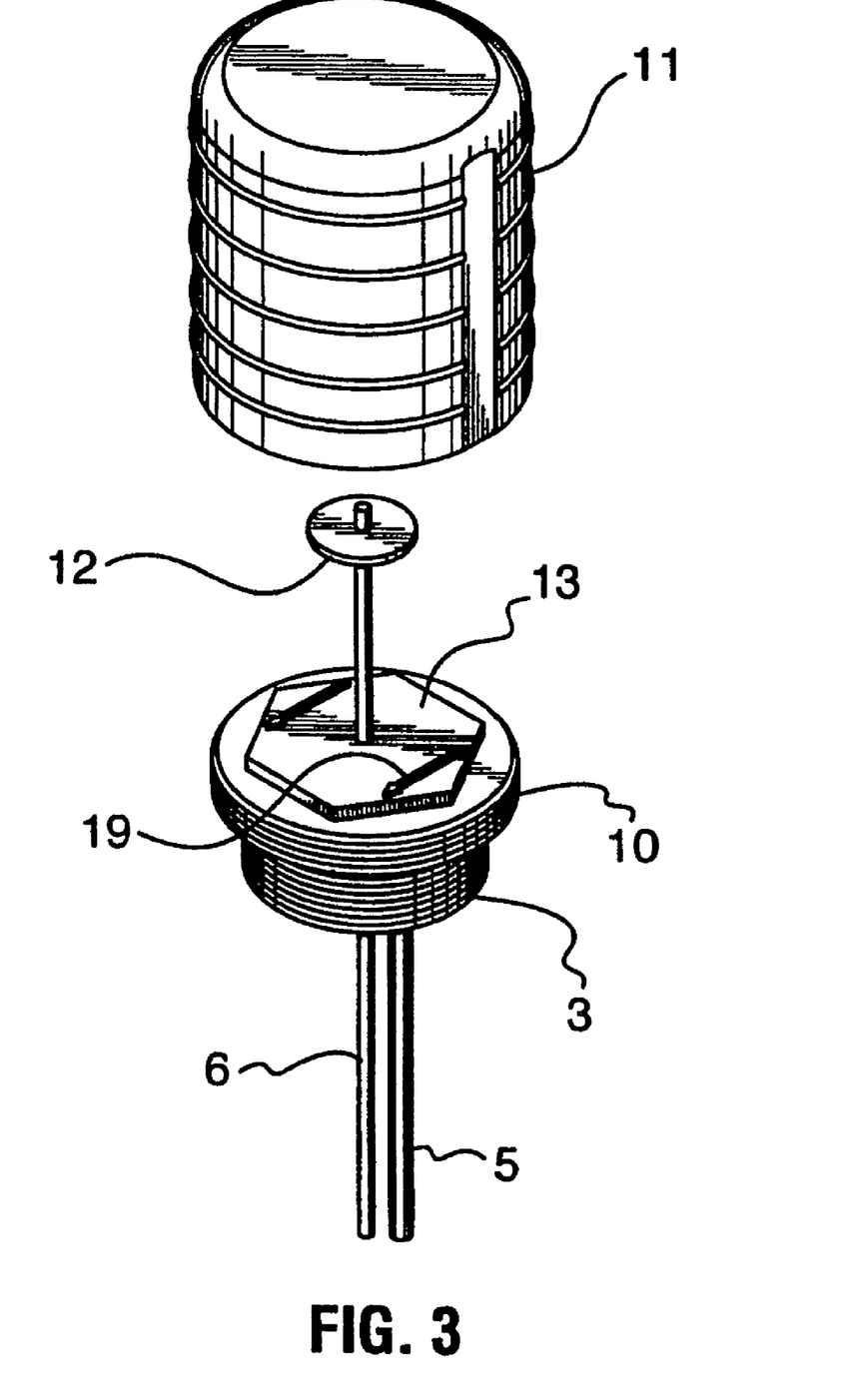
FIG. 3 is a perspective view of a top portion of a liquid level indicator in accordance with an embodiment of the present invention.
Figure 4:
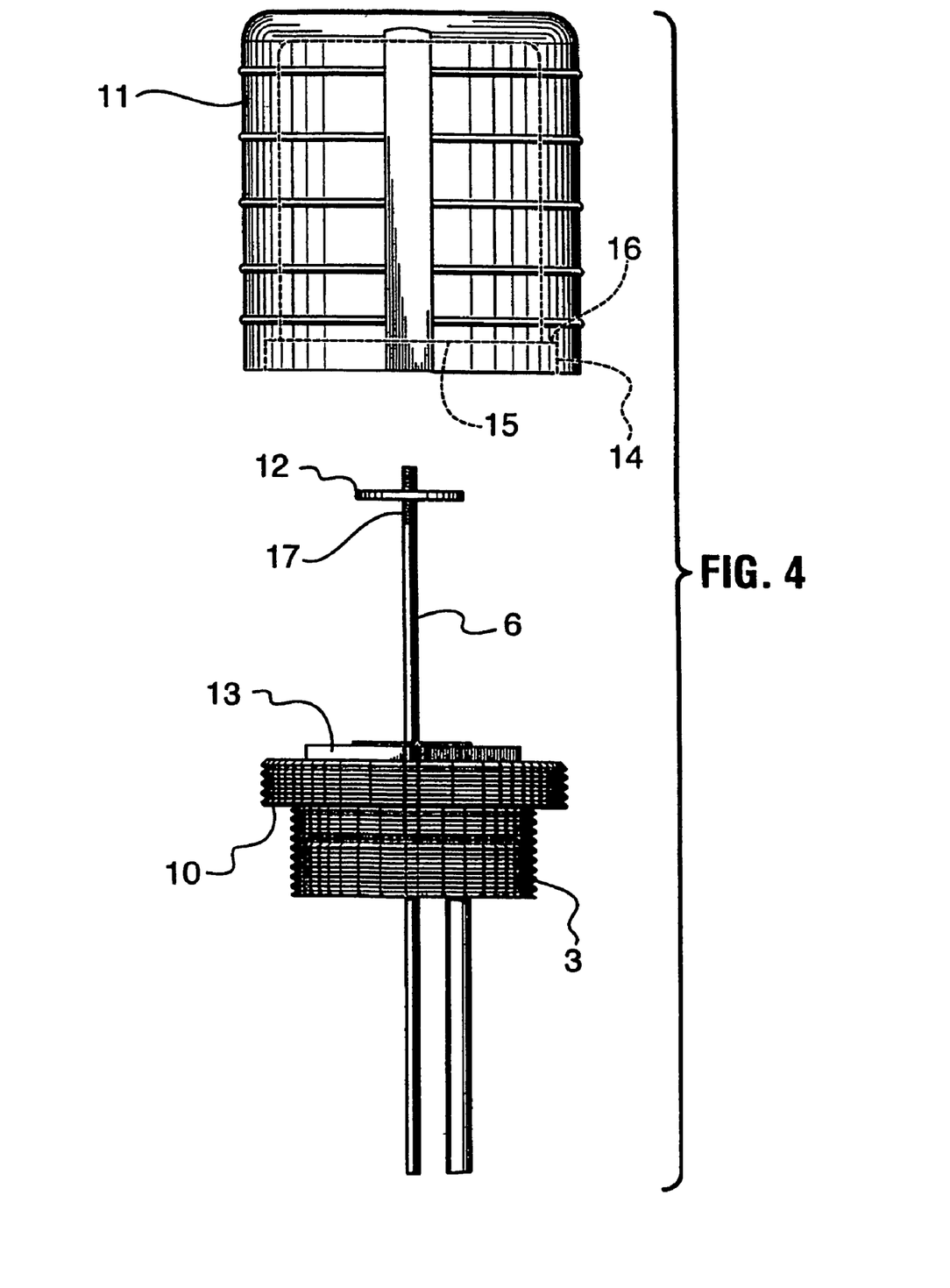
FIG. 4 is a side plan view of a top portion of a liquid level indicator in accordance with an embodiment of the present invention.

The slidable rod (6) is seen passing through the male screw portion (3) and a second male screw portion (10), having a greater diameter than the first, for sealing engagement with the inverted transparent cup (11). As seen in FIGS. 3 and 4, a raised hexagonal portion rests above the second male screw portion (10) which is used to tighten the screw portions (3,10) to the collar flange of the receptacle, preferably by using a wrench. As seen in FIG. 3, the raised hexagonal portion (13) has arrows (19) which serve to indicate the direction of the float (8). Together, the elements 3,10, 13 and 19 form a base block. The transparent cup (11) may then be secured around the second male screw portion (10). In this way, the transparent cup (11) is the only portion of the indicator (1) which remains exposed to the area outside of the receptacle thus assisting in providing a seal between the interior and exterior of the receptacle. As the liquid level within the receptacle changes the float (8) rises and falls causing the float rod (7) to move thereby causing the slidable rod (6) to slide through the male screw portions (3,10) and a gauge disc (12) attached to the slidable rod (6) (preferably to the end thereof) changes position with respect to the transparent cup, which has markings thereon, thereby providing a reading as to the liquid level. The slidable rod (6), fixed rod (5) and float rod (7) lie in a common plane. The slidable rod (6) is pivotally connected to the float rod (7) at a location farther to the float (8) than the float rod (7) and fixed rod pivot connection, however the relative position of these two pivots may be interchanged.

The fixed rod (5) is pivotally secured to the float rod (7) at a point spaced a suitable distance from the slidable rod (6) and the fixed rod (5) extends upwardly and its upper end is connected to the first male screw portion (3). The underside of the base block, as seen in FIG. 1, comprises a holder portion (18) which holds the fixed rod (5) in place.

The first male screw portion (3) is designed to be fit with the collar flange to form a liquid- and gas-tight seal and to hold the indicator (1) in place on the receptacle and thereby to contact the second screw portion (10) to the receptacle. The first and second screw portions (3,10), are then covered with the durable transparent cup (11). As seen in FIG. 4, the durable transparent cup (11) has an open interior threaded end (14) having an inwardly directed flange (16) at its lower end shaped to rest on a gasket (15), the diameter of the flange (16) being the same as the gasket (15) whereby tightening of the durable transparent cup (11) distorts the gasket body (15) downwardly until the flange (16) and gasket seal (15) come in contact with the top of the second male screw portion (10) to secure a complete seal with a single gasket (15) and to form another liquid- and gas-tight seal which constitutes a substantially complete barrier against external and internal pressure.

The base block comprising both the first and second male screw portions (3) and (10) as well as the raised hexagonal portion (13) and arrows (19) is provided with a central hole which allows the slidable rod (6) with a threaded end (17), as seen in FIG. 4, at the upper end to extend through the base block into the interior of the transparent cup (11). The adjustable gauge disc (12) is secured to the upper threaded end (17) of the slidable rod (6). The transparent cup (11) has suitable gauge marks arranged on its face, either inside or outside to indicate, with the gauge disc (12), the level of the liquid in the receptacle on which the indicator (1) is installed. The transparent cup may have rounded sides with a rounded top made of a suitable material such as a durable plastic material which is made of an appropriate hardness so as, on the one hand not to crack, and on the other hand, not to bend or crumble easily. The transparent cup has an interior flange for support, is weather tight, and substantially eliminates chlorine-laden water. The base block is raised in the centre for installation and to further eliminate chlorine-laden water penetration. The base block is threaded at the outer edge to allow the transparent cup (11) to completely cover the base block.

The liquid level indicator should register a correct reading at all times regardless of the level of the liquid and provide a complete or acceptable barrier against external and internal pressure. The indicator has relatively few working parts, is relatively simple in construction and is relatively simple to install. The indicator also indicates the direction of the float. The float itself is selected so as not to absorb moisture thus enabling correct readings for a considerable period of time. The indicator is generally durable, dependable, and efficient for its purpose.

The present invention may be used with various tanks, receptacles or the like where liquid level indication is desired.

Figures 5, 6:
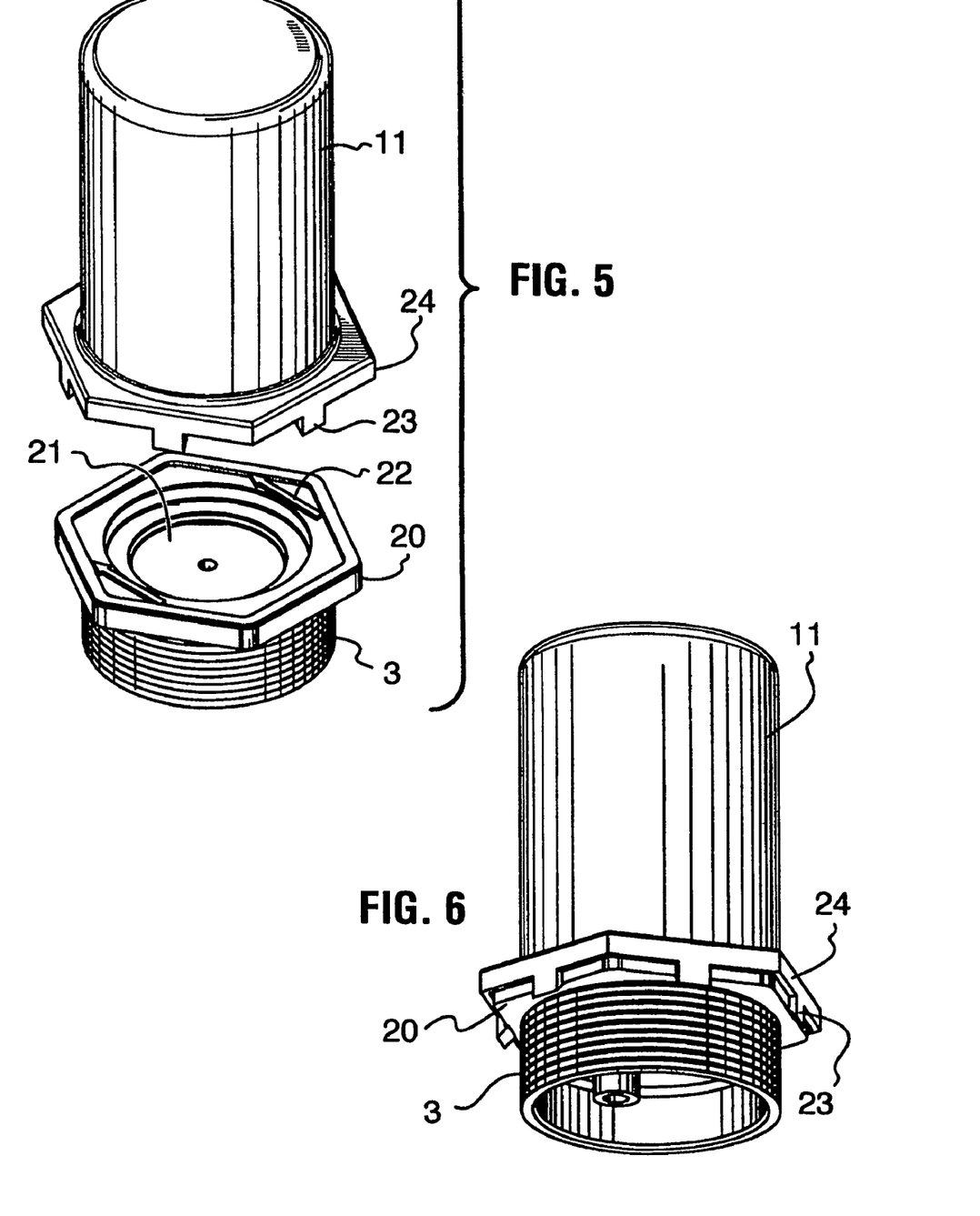
FIG. 5 is a perspective view of an enclosure in accordance with an embodiment of the present invention ready for insertion on an existing tank gauge base block.
FIG. 6 is a perspective view of the enclosure and existing tank gauge base block of FIG. 5.

Referring now to FIGS. 5 and 6, an alternative embodiment is illustrated. As mentioned above, an aspect of the present invention is directed to the enclosure or transparent cup (11) itself. The enclosure (11) may be as described hereinabove or may be of another configuration to be convenient for use with existing liquid gauges as will now be described by way of example. Liquid gauges may be of the configuration as illustrated in FIG. 5 having a male screw portion (3) for screwing onto a receptacle or the like, a hexagonal or otherwise shaped portion (20) having a cavity (21) for receiving a standard enclosure (not shown) therein and direction arrows (22). Instead of using an enclosure to fit within the cavity (21) of the hexagonal portion (20), this embodiment of the present invention proposes use of an enclosure (11) to fit around and engage with the hexagonal portion (20) (as seen in place in FIG. 6). FIGS. 5 and 6 illustrate an example of how this arrangement may be configured, for instance with resilient members (23) disposed around a base portion (24) of the enclosure (11). The enclosure (11) is pressed onto the hexagonal portion (20), thus displacing the resilient members (23) outwardly until they are disposed beneath the rim of the hexagonal portion (20) in locked engagement. Various other snap, friction fit or other configurations can also be employed.

Figure 7:
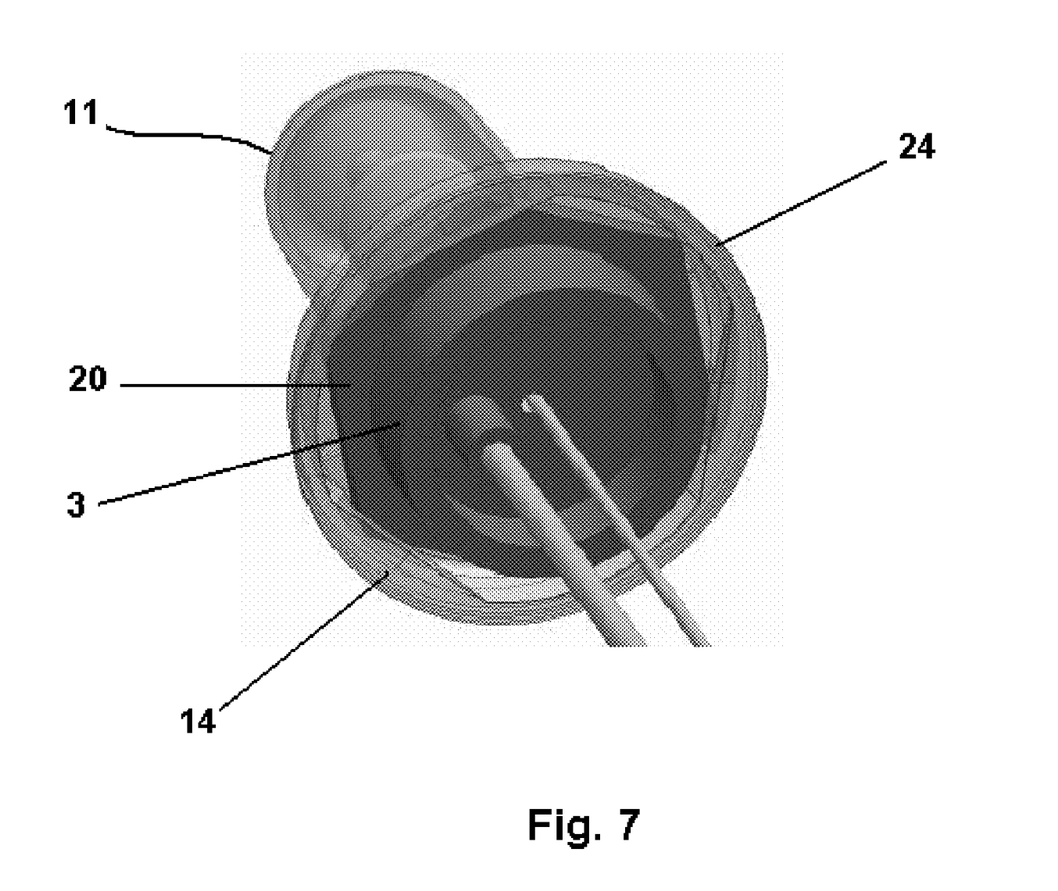
FIG. 7 is a perspective view of the underside of an enclosure in accordance with another embodiment of the present invention in connection with an existing tank gauge base block.

For instance, as shown in FIG. 7, the enclosure may include interior locking cams (14) disposed around the base portion (24) of the enclosure (11). This embodiment of the enclosure (11) is positioned onto the hexagonal portion (20), and twisted such that the interior locking cams (14) secure the base portion (24) of the enclosure (11) to the rim of the hexagonal portion (20) in locked engagement.

The enclosure is equipped with a collapsible gasket seal to provide the sealing facility described above.

Figure 8A:
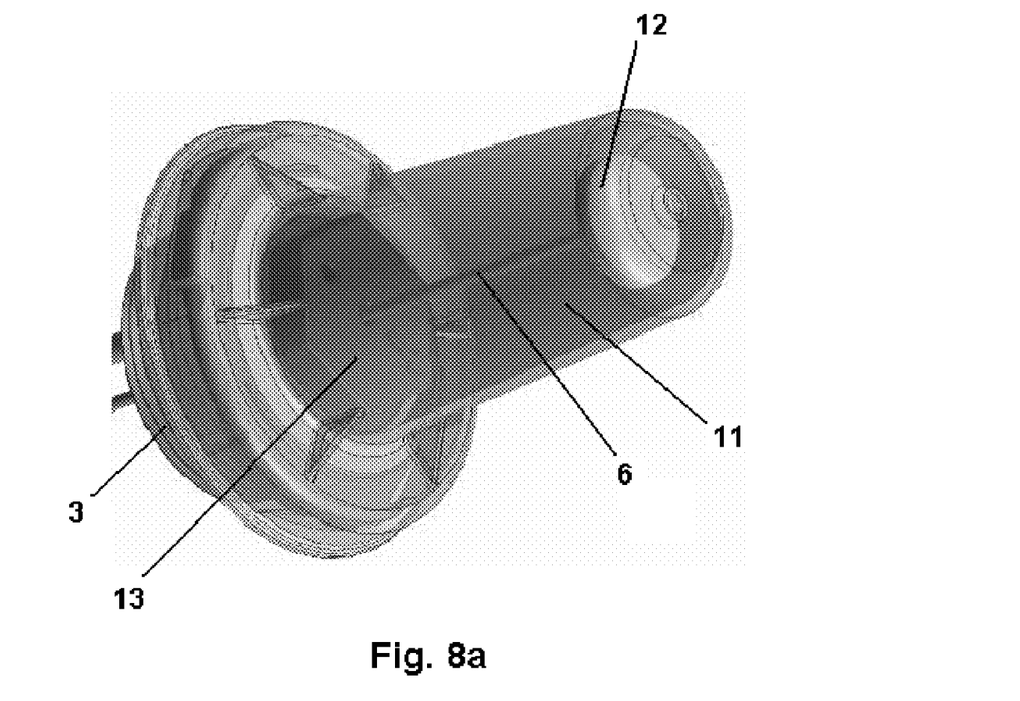
FIG. 8a is a perspective view of a top portion of a liquid level indicator in accordance with another embodiment of the invention, showing an enclosure having locking cams in connection with a base block having locking projections and locking indents.
Figure 8B:
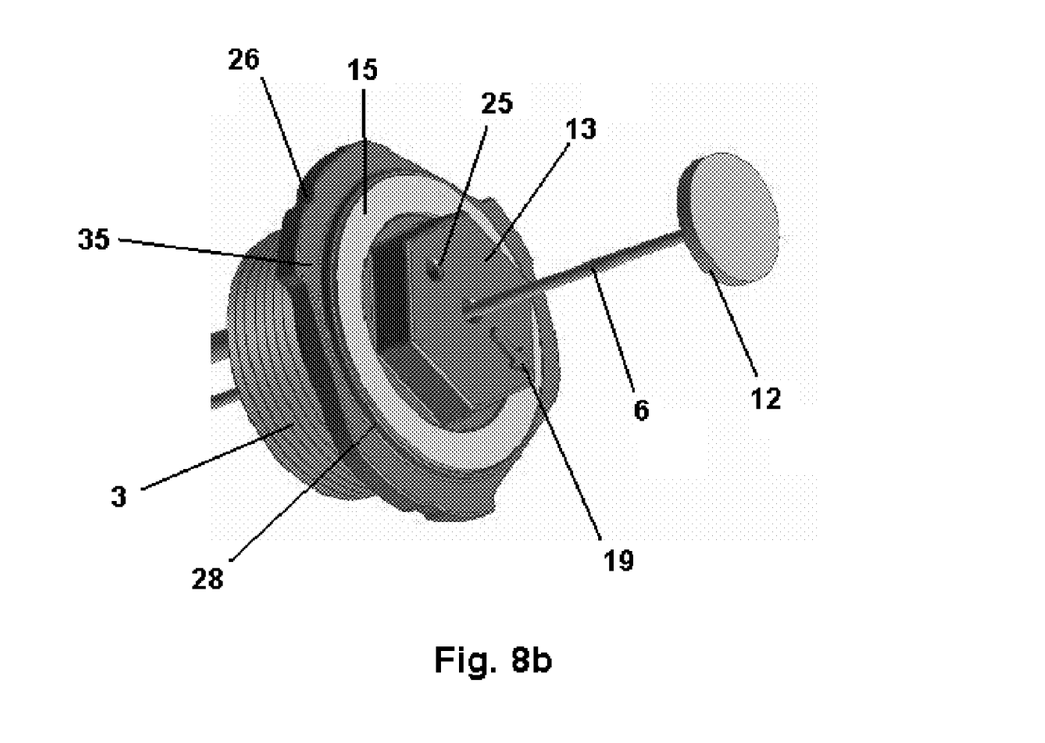

The liquid level indicator of the invention may also incorporate an enclosure having locking cams, as is shown in FIGS. 8a and 8b. In this example, the float (8), float rod (7), fixed rod (5) and slidable rod (6) are as described above. However, the threads of the second male screw portion (10) shown in FIGS. 1 to 4 are replaced with locking projections (35) and locking indents (26). When twisted onto the enclosure (11), the locking projections (35) engage with the interior locking cams (14) of the enclosure (11), distorting the enclosure (11) until the interior locking cams (14) relax into the locking indents (26), thus fastening the enclosure (11) to the base block in locked engagement.

Figure 9A:
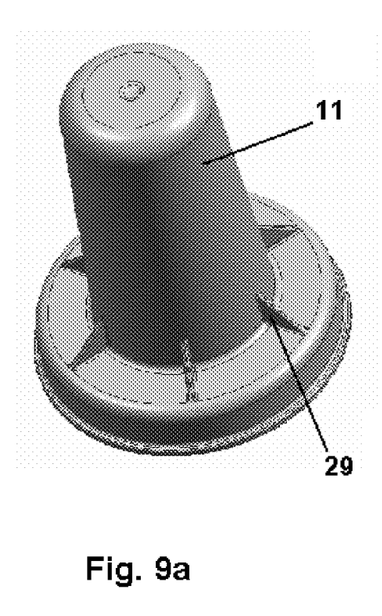
FIGS. 9a and 9b are, respectively, perspective views of the top and bottom of the enclosure shown in FIG. 8a; and, FIGS. 10a and 10b are, respectively, perspective views of the top and bottom of the base block shown in FIG. 8b.
Figure 9B:
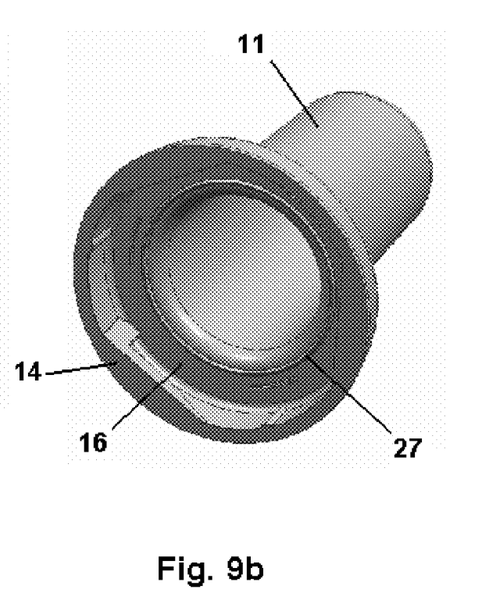

FIGS. 9a and 9b are top and bottom views of an enclosure (11) having interior locking cams (14). Although not required, the embodiment shown in FIG. 9a includes support ribs (29) on an upper surface of the enclosure (11) so as to increase the strength and durability thereof. The enclosure (11) may also have an inwardly directed annular flange (16) at its lower end, shaped to rest on the gasket (15). The diameter of the flange (16) is preferably the same or similar to that of the gasket (15). Thus, tightening of the enclosure (11) onto the base block results in an effective seal with the gasket (15) and a substantially liquid and gas-tight barrier. The enclosure (11) may also include an inner ring (27) formed therein for additional support.

Figure 10A:
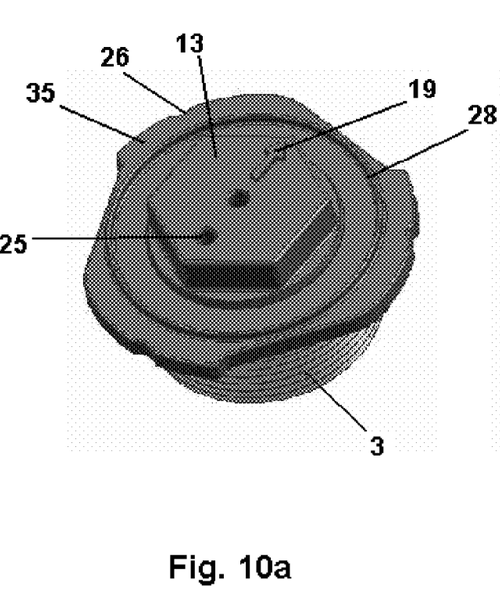
Figure 10B:
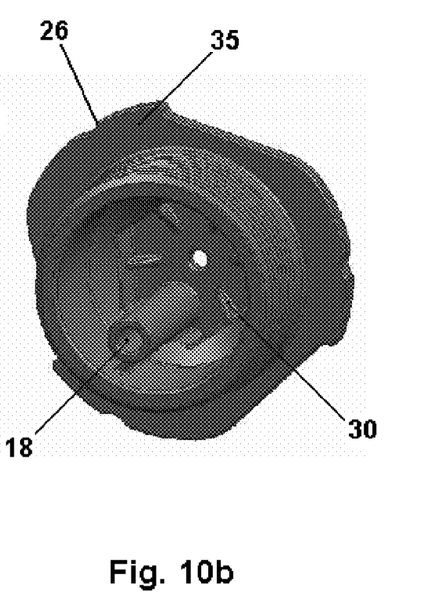

As seen in FIGS. 10a and 10b, the raised hexagonal portion (13) of the base block typically rests above the locking projections (35) and locking indents (26). The underside of the raised hexagonal portion (13) may further comprise support ribs (30), in order to increase the strength thereof. A raised height setting ring (28) may also be provided, as shown in FIG. 10a, in order to resist excessive pressure on the gasket (15), and to further ensure a liquid and gas-tight seal. The holder portion (18) positioned on the underside of the base block, which holds the fixed rod (5) in place, may further include a reaming hole (25) extending through to the upper surface of the raised hexagonal portion (13). Inclusion of this reaming hole (25) minimizes the pressure formed when inserting the fixed rod (5) into the holder portion (18), and thus facilitates assembly of the liquid level indicator.

The foregoing are exemplary embodiments of the present invention and a person skilled in the art would appreciate that modifications to these embodiments may be made without departing from the scope of the invention.

INDUSTRIAL APPLICABILITY

The present invention provides a useful liquid level indicator, and an enclosure for use therewith. The liquid level indicator and enclosure are particularly useful when used in combination with domestic oil tanks, since the enclosure substantially limits/restricts water from entering such tanks, and thus reduces the presence of chlorine-laden water therein and the corrosive effects thereof. Accordingly, use of the liquid level indicator and enclosure of the present invention is purposed to prevent oil spillage due caused by corrosion and failure of a domestic oil tank.

The invention claimed is:

1. A liquid level indicator for use with a receptacle, the indicator comprising:
   a base block for sealing engagement with a receptacle opening area;
   an enclosure for sealing engagement with said base block and shaped and dimensioned to cover substantially entirely a portion of the base block extending outside the receptacle for shielding the base block against precipitation;
   a float arrangement comprising a float disposed for floating at a liquid level within the receptacle, and a sliding rod connected to the float at one end and having a distal end extending slidably through the base block into the enclosure,
   the enclosure being adapted for indicating the position of the slidable rod within the enclosure to thereby determine the liquid level within the receptacle,
   the enclosure being provided with an interior flange lying parallel with the enclosure opening;
   internal threadings disposed between the enclosure opening and the flange; and
   a gasket disposed between the internal flange and the internal threadings, whereby tightening of the enclosure onto the base block distorts the gasket until the gasket comes in contact with the base block to form a liquid- and gas-tight seal.

2. An indicator according to claim 1, characterized in that the base block includes a raised portion for receiving a wrench for tightening of the base block to the receptacle opening.

3. An indicator according to claim 1, characterized in that the enclosure has markings for reading the liquid level.

4. An indicator according to claim 1, characterized in that the enclosure is at least partially transparent thus allowing visual inspection of the slidable rod therein and wherein the slidable rod has an indicator disk attached thereto to facilitate readings of the position of the slidable rod with respect to the enclosure and thus reading of the liquid level.

5. An indicator according to claim 1, characterized in that the float is made of a material which is resistant to moisture accumulation.

6. An indicator according to claim 1, characterized in that the receptacle is a heating oil tank.

7. An indicator according to claim 1, characterized in that the receptacle opening area is a collar flange.

8. An indicator according to claim 1, characterized in that the enclosure comprises at least one resilient member at an open end thereof for engagement with the base block for resiliently deforming to achieve a secure fit.

9. An indicator according to claim 8, characterized in that said at least one resilient member is a half arrow shaped clip adapted to be pressed against and locked under the base block.

10. A liquid level indicator for use with a receptacle, the indicator comprising:
    a base block for sealing engagement with a receptacle opening area;
    an enclosure for sealing engagement with said base block and shaped and dimensioned to cover substantially entirely a portion of the base block extending outside the receptacle for shielding the base block against precipitation;
    a float arrangement comprising a float disposed for floating at a liquid level within the receptacle, and a sliding rod connected to the float at one end and having a distal end extending slidably through the base block into the enclosure,
    the enclosure being adapted for indicating the position of the slidable rod within the enclosure to thereby determine the liquid level within the receptacle, the enclosure being provided with an interior flange lying parallel with the enclosure opening and interior locking cams disposed between the enclosure opening and the flange, and wherein the base block comprises locking projections and locking indents disposed at an outer edge thereof for locking engagement with the interior locking cams of the enclosure.

11. An indicator according to claim 10, characterized in that said indicator further comprises a gasket , disposed between the internal flange and the base block , whereby tightening of the enclosure onto the base block forms a liquid and gas-tight seal.

* * * * *